United States Patent
Sculuca (10) Patent No.: US 7,107,898 B2
(45) Date of Patent: Sep. 19, 2006

(54) SKEWER HOLDER

(76) Inventor: Fred S. Sculuca, 130 Anne St., Baden, PA (US) 15005

( * ) Notice: Subject to any disclaimer, the term of this patent is extended or adjusted under 35 U.S.C. 154(b) by 242 days.

(21) Appl. No.: 10/349,617

(22) Filed: Jan. 23, 2003

(65) Prior Publication Data

US 2004/0025709 A1    Feb. 12, 2004

Related U.S. Application Data

(60) Provisional application No. 60/401,430, filed on Aug. 6, 2002, provisional application No. 60/420,750, filed on Oct. 23, 2002.

(51) Int. Cl.
A47J 37/04    (2006.01)

(52) U.S. Cl. .................. 99/421 A; 99/421 H; 99/419

(58) Field of Classification Search ............. 99/421 A, 99/421 R, 421 V, 419, 421 H, 421 HH, 421 HV
See application file for complete search history.

(56) References Cited

U.S. PATENT DOCUMENTS

| | | | |
|---|---|---|---|
| 1,061,431 A * | 5/1913 | West .................. 99/419 |
| 2,634,674 A * | 4/1953 | Urth .................. 99/419 |
| 2,654,307 A * | 10/1953 | Nisenson ............ 99/421 H |
| D183,005 S * | 6/1958 | Krause ................ D7/409 |
| 4,324,174 A | 4/1982 | Conradt | |
| 4,429,435 A | 2/1984 | Walls | |
| 4,589,399 A * | 5/1986 | Hamill et al. ........... 126/30 |
| 4,724,753 A | 2/1988 | Neyman | |
| 4,839,186 A | 6/1989 | Boyle | |
| 4,887,523 A | 12/1989 | Murphy | |
| 5,109,757 A | 5/1992 | Dolle | |
| 5,650,085 A | 7/1997 | Chen | |
| 5,715,744 A | 2/1998 | Coutant | |
| 5,887,513 A | 3/1999 | Fielding | |
| 6,439,109 B1 | 8/2002 | Rehill | |
| 6,474,224 B1 | 11/2002 | Natter | |

FOREIGN PATENT DOCUMENTS

FR    2701201    * 8/1994

* cited by examiner

*Primary Examiner*—Reginald L. Alexander
(74) *Attorney, Agent, or Firm*—Pepper Hamilton LLP (57) ABSTRACT

An improved device holds a skewer over a hot surface such as a grill or an open flame. The device preferably accommodates any type or size of skewer. It allows for skewered food to be rotated for even cooking or searing and prevents the skewered food from sticking to the grate of a grill while cooking.

4 Claims, 13 Drawing Sheets

FIG. 11 ium entitled Skewer Holder, filed Aug. 6, 2002, having a Ser. No. 60/401,430 and (ii) the provisional U.S. application entitled Skewer Holder, filed Oct. 23, 2002, having a Ser. No. 60/420,750, each of which is hereby incorporated by reference in its entirety.

SKEWER HOLDER

PRIORITY

This application claims priority to: (i) the provisional U.S. application entitled Skewer Holder, filed Aug. 6, 2002, having a Ser. No. 60/401,430 and (ii) the provisional U.S. application entitled Skewer Holder, filed Oct. 23, 2002, having a Ser. No. 60/420,750, each of which is hereby incorporated by reference in its entirety.

FIELD OF THE INVENTION

This invention relates to barbecue grill accessories. More particularly, this invention relates to a device for holding skewered kabobs during cooking on a barbecue grill, barbecue pit, fireplace, open flame, or other cooking area.

BACKGROUND OF THE INVENTION

Barbecue skewers receive food to be placed on or over a grill, fire, other heat source for cooking. A problem with prior skewers is that they must be placed directly on a grill, resulting in charred food or food that sticks to the grate of the grill. This results in a grill or grate that is very difficult to clean. Because of the difficulty in cleaning, many grills are re-used without cleaning, thus creating a risk of contaminating food during later cooking events, especially when the food comes in contact with the grill. In an attempt to avoid these problems, a person could hold the skewer over the flame or other heat source while cooking, but that creates a risk of injury from burning to the person.

The present invention is directed to an improved device for holding a skewer and preventing the skewered food from sticking to the grate of a grill while cooking. It also helps the user avoid the risk of injury that may result from manual holding of the skewer over the heat or flame.

SUMMARY OF THE INVENTION

The present invention provides an improved device for suspending skewers onto which food has been impaled for cooking. The skewered food is preferably suspended over a cooking surface, such as a grate, instead of being placed directly onto the surface. This prevents the food from being contaminated from contacting the cooking surface, and it also results in a cleaner grill after cooking.

When food is placed on the skewers in accordance with preferred embodiments of the invention, the food partially or fully covers the skewer. Thus, the skewer acts as a heat conductor and helps cook the inner part of the food. The present invention also enables skewered cooking without touching the cooking grate. This allows for full rotation of impaled food items, therefore permitting a substantially even and thorough cooking of the food.

DESCRIPTION OF THE DRAWINGS

FIG. 9A illustrates a perspective view of a one-piece, freestanding embodiment, while

DETAILED DESCRIPTION OF PREFERRED EMBODIMENTS OF THE INVENTION

The present invention includes various embodiments of a skewer holder that allows food to be cooked (with or without cooking grates) over charcoal, on gas grills, in ovens, in open campfires, in fireplaces, in fire pits and in other places using common heat sources.

Preferably, the invention is used with conventional skewer holders that are constructed of steel or another appropriate conductive metal, although wooden skewers or skewers made of other materials may also be used. Such skewers are typically designed to securely hold food items on skewers. They also allow skewered food to be rotated for even cooking or searing. When removing the skewers from the heat source or placing them onto the heat source, the user will preferably wear heat proof or heat resistant gloves or other appropriate protection to prevent burns.

Conventional skewers are constructed of steel (stainless steel is preferred) and are available today in various lengths, shapes, and diameters. The present invention is intended to accommodate any type of skewer, including but nor limited to round, square, and flat skewers. The round or square skewer is preferred, as round and square skewers allow for more complete rotation of the food.

Preferably, the present inventive skewer holders are constructed to hold a minimum of four skewers, because skewers are normally sold in sets of four. However, the invention is not limited to embodiments that accommodate four skewers, and options that accept any number of skewers, including fewer than four and more than four, are included in the invention.

Figures 1A, 1B:
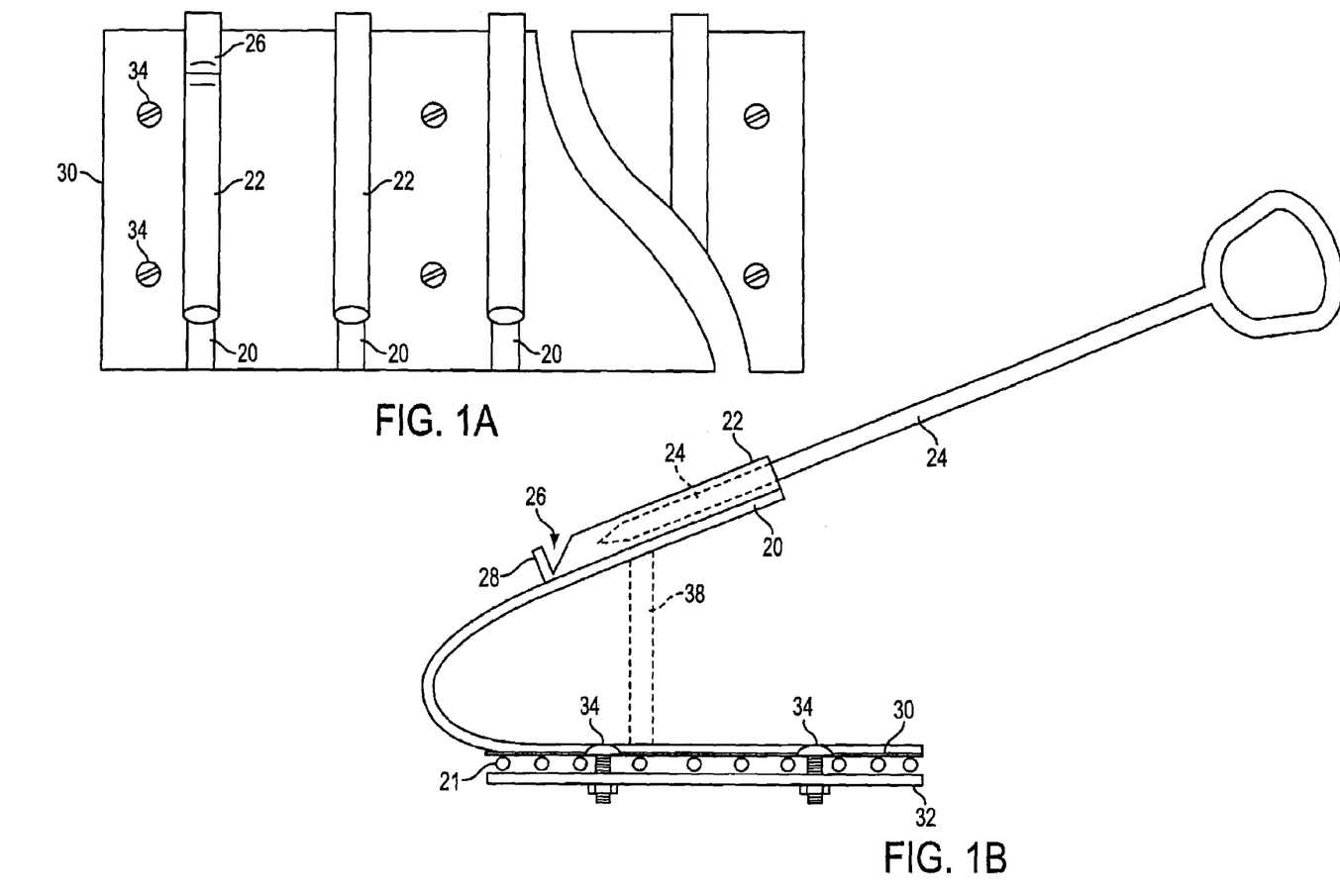
FIG. 1A illustrates a top view of a first preferred embodiment of the present invention.
FIG. 1B illustrates a side view of the embodiment of the skewer holder of FIG. 1A and shows a preferred means of attaching the holder to a cooking grate.

FIGS. 1A and 1B illustrate a first preferred embodiment of the inventive skewer holder. The holder is comprised of a plurality of rods 20, preferably flat rods that are curved or angled so that a lower, substantially horizontal portion may contact or be placed above a grill surface 21 and an upwardly sloping portion may extend up and angularly away from the grill surface 21. In preferred embodiments, rods that are ¼" square, ½" square or ½"×¼" rectangular are used, although any suitable size will be appropriate and considered part of the invention. The upwardly sloping portion of each rod 20 may be attached to a tube 22 that is sized and positioned to receive the point of a conventional skewer 24. The embodiment illustrated in FIG. 1B shows a tube 22 that is secured to the rod 20 by welding, but optionally the tube may be formed in an integral manner with the rod. In the alternative, the rod itself may contain a center hole that serves the function of the tube. As a further alternative, instead of providing a separate rod for each tube as shown in FIG. 1A, a support frame such as two rods may be provided with a cross member to which the receiving tubes area attached. In any of the options, the tube 22 and/or rod preferably includes a weep hole 26 to allow food juices to drip out during cooking, and to allow for cleaning after cooking. Although FIG. 1B illustrates the weep hole as facing upward, in alternate embodiments the weep hole may face any direction (such as downward), and a downward facing weep hole is preferred in an embodiment whether the tubes are attached to a cross member rather than a rod. The preferred tube 22 or the rod also includes a stop 28 to prevent the skewer from sliding past the point of the stop. Preferably, the length of the tube 22 from the point where it receives the skewer 24 to the stop 28 is about 2½", although any suitable length may be used. Also preferably, the rod 20 is angled so that the receiving area of the tube 22 is about three inches above the grill surface 21.

It should be noted that the dimensions listed in the text and/or illustrated in the figures herein are preferred dimensions only. Any dimensions that will work to design a skewer holder that receives a skewer are included within the scope of the invention.

As illustrated in FIG. 1A, the rods 20 are preferably substantially evenly spaced, and the elongated, horizontal portions of each rod are preferably secured to a first plate 30. In a preferred embodiment (FIG. 1B), a second plate 32 is provided under the first plate 30 and is positioned so that the grill or cooking surface 21 is between the first plate 30 and the second plate 32. A plurality of fasteners 34, such as nuts and bolts, are used to secure the first and second plates, and thus the entire apparatus, to the grill.

Figure 2:
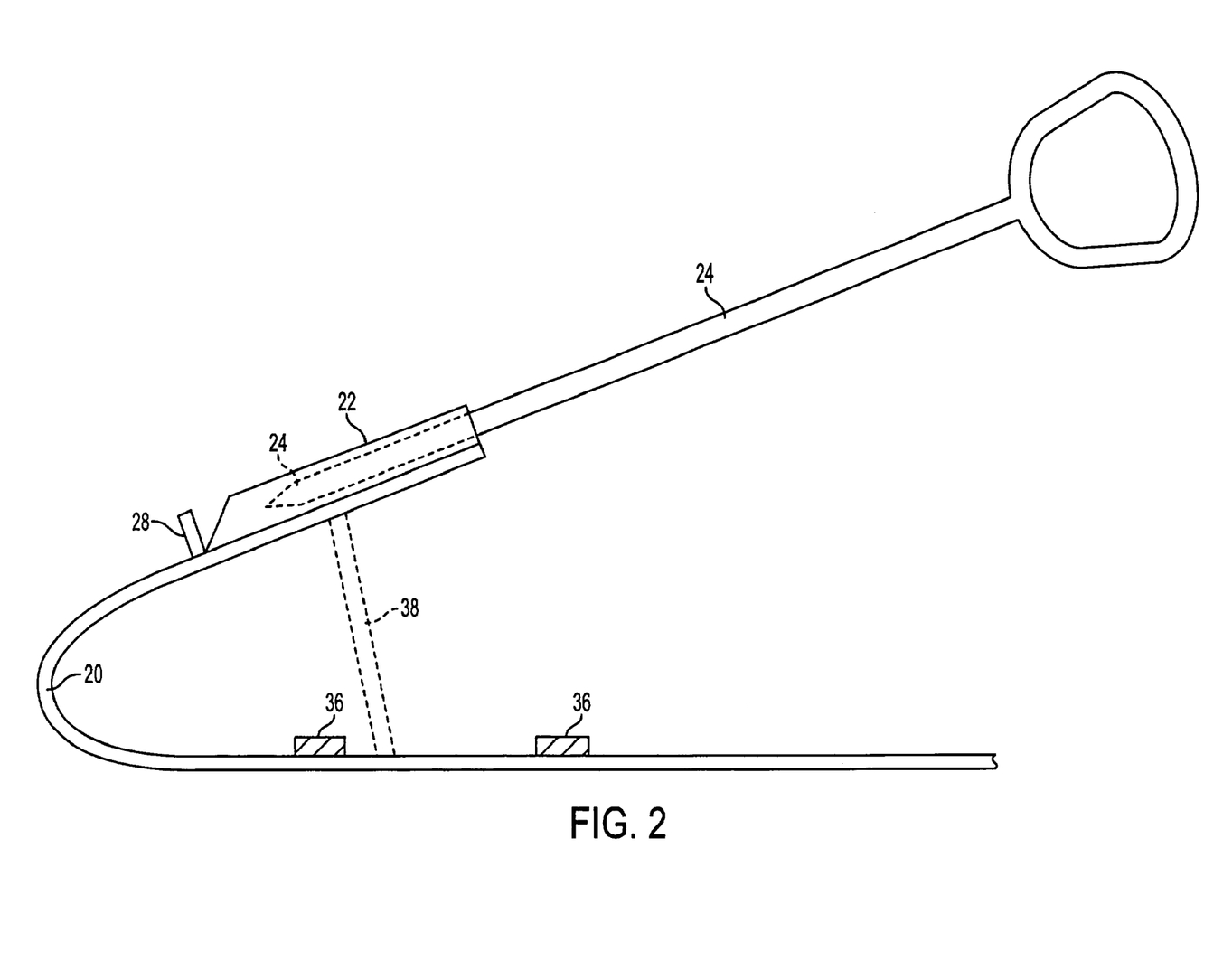
FIG. 2 illustrates an alternate side view of the embodiment of FIG. 1B whereby the holder is not attached to the grate but rather rests on the grate.

Alternatively, as illustrated in FIG. 2, a free-standing embodiment may include one or more (and preferably two or more) cross members 36 that are attached (e.g., welded) to the horizontal portion of each of the rods 20, preferably in a position that is perpendicular to the rods 20. In the free standing embodiment, the horizontal portion must be of sufficient length, preferably at least about twenty inches, and of sufficient weight to serve as a counterbalance when skewers are placed in the holders. The free standing skewer holder is particularly useful in open fires such as fire pits, campfires, fireplaces and in closed ovens. The free standing embodiments are preferably welded constructions, and they preferably can also accommodate larger, longer skewers. Optionally and preferably, a drip pan (such as a commercially available, disposable aluminum pan) is placed under this embodiment to catch dripping juices and reduce the resulting mess. Also optionally, in either the embodiment of FIGS. 1A and 1B or the embodiment of FIG. 2, a support brace member 38 may be included as illustrated in the figures.

Figure 3A:
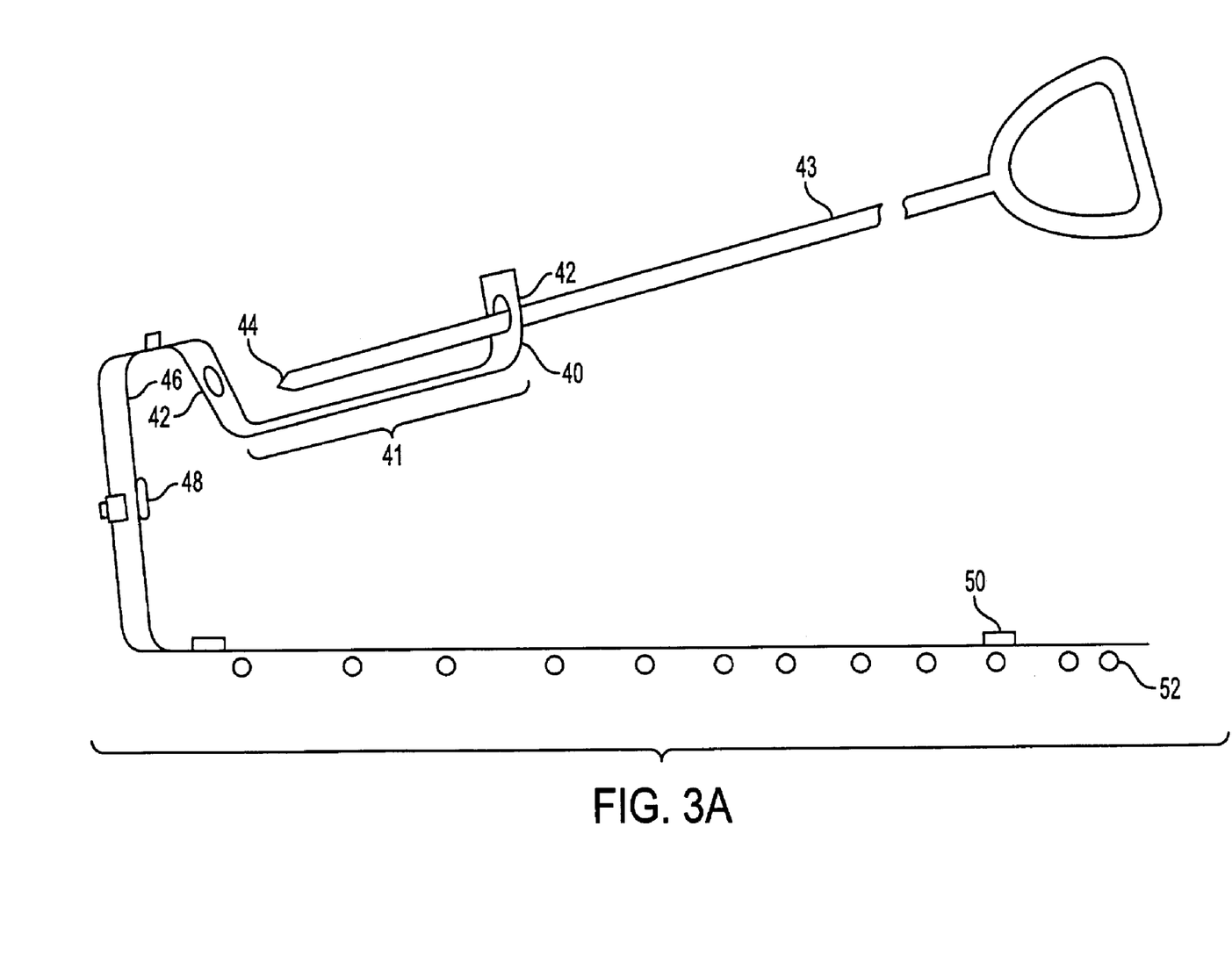
FIGS. 3A through 3C illustrate an alternate version of the embodiments of FIGS. 1A, 1B and 2.
Figure 3B:
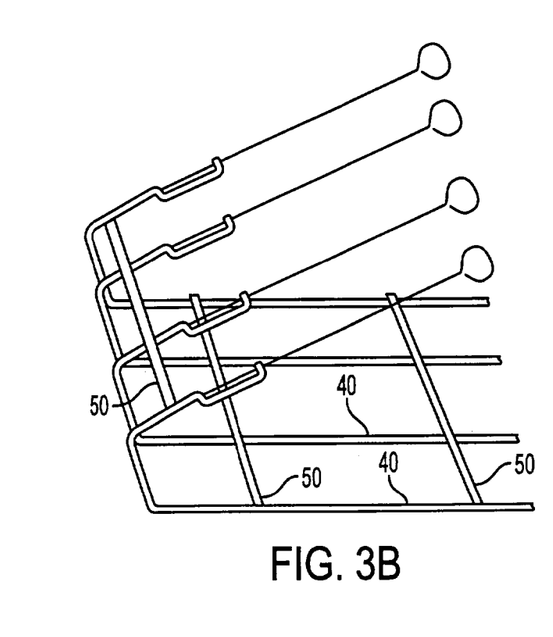
Figure 3C:
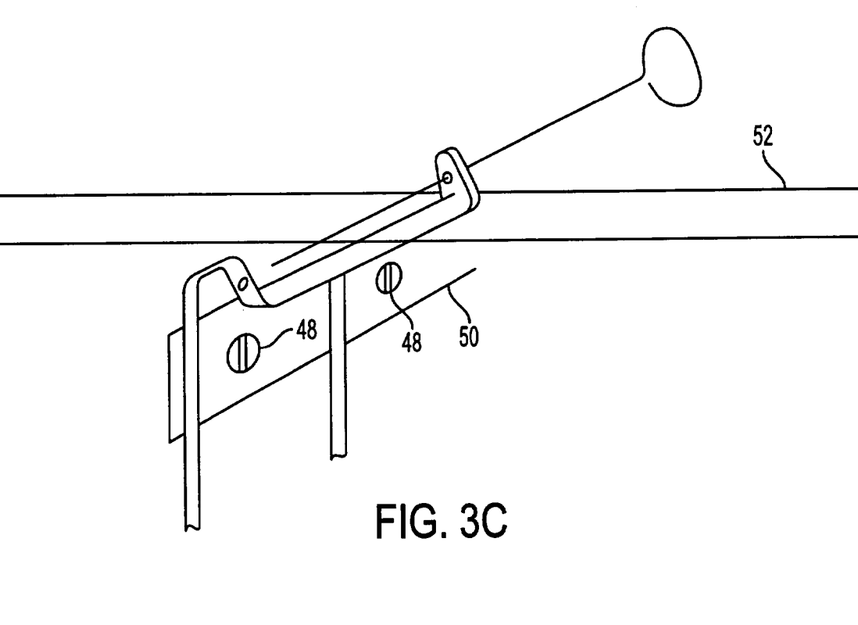

FIGS. 3A and 3B illustrate an alternate embodiment wherein flat metal rods 40 are used instead of tubular rods or rods with attached receiving tubes. As illustrated in FIG. 3A, the rod is bent in at least three places to form a receiving area 41, and two holes 42 are located in the receiving area 41 to receive a skewer 43. However, as an alternative, the receiving area 41 may be formed by two bends in the rod, with a curve (such as that which may be formed using a one-inch die) located in between the bends and forming the receiving area 21. When the skewer 43 is completely inserted into each hole 42, the tip 44 of the skewer may rest against the vertical portion 46 of the rod. This design provides several advantages, including the elimination of the need for welded receiving tubes, a more open design that is easier to clean since juices simply fall over the rod onto the heat source, and a lower corner that is easily bendable to accommodate varying grill heights. An optional fastener 48 may be used to attach the vertical portion of the rod to the side of the grill or to another fixed object to provide support. Alternatively, or in addition to the optional fastener 48, as illustrated in FIG. 3B, multiple skewer holders may be attached using optional cross members 50, thus providing a multi-skewer unit that can be free standing. The cross members 50 may be welded, riveted, or otherwise fastened to the rods 40. This type of skewer holder can be attached above the grate of the grill 52 as shown in FIG. 3A, or it can optionally be attached below the grate of the grill as illustrated in FIG. 3C. In the embodiment illustrated in FIG. 3C, optional fasteners are preferably used to attach the skewer holder unit to a side or other fixed portion of the grill. In this embodiment, the lower horizontal base portion of each rod is optional, as the fasteners preferably provide the primary support for the skewer holders.

Figures 4A, 4B, 4C:
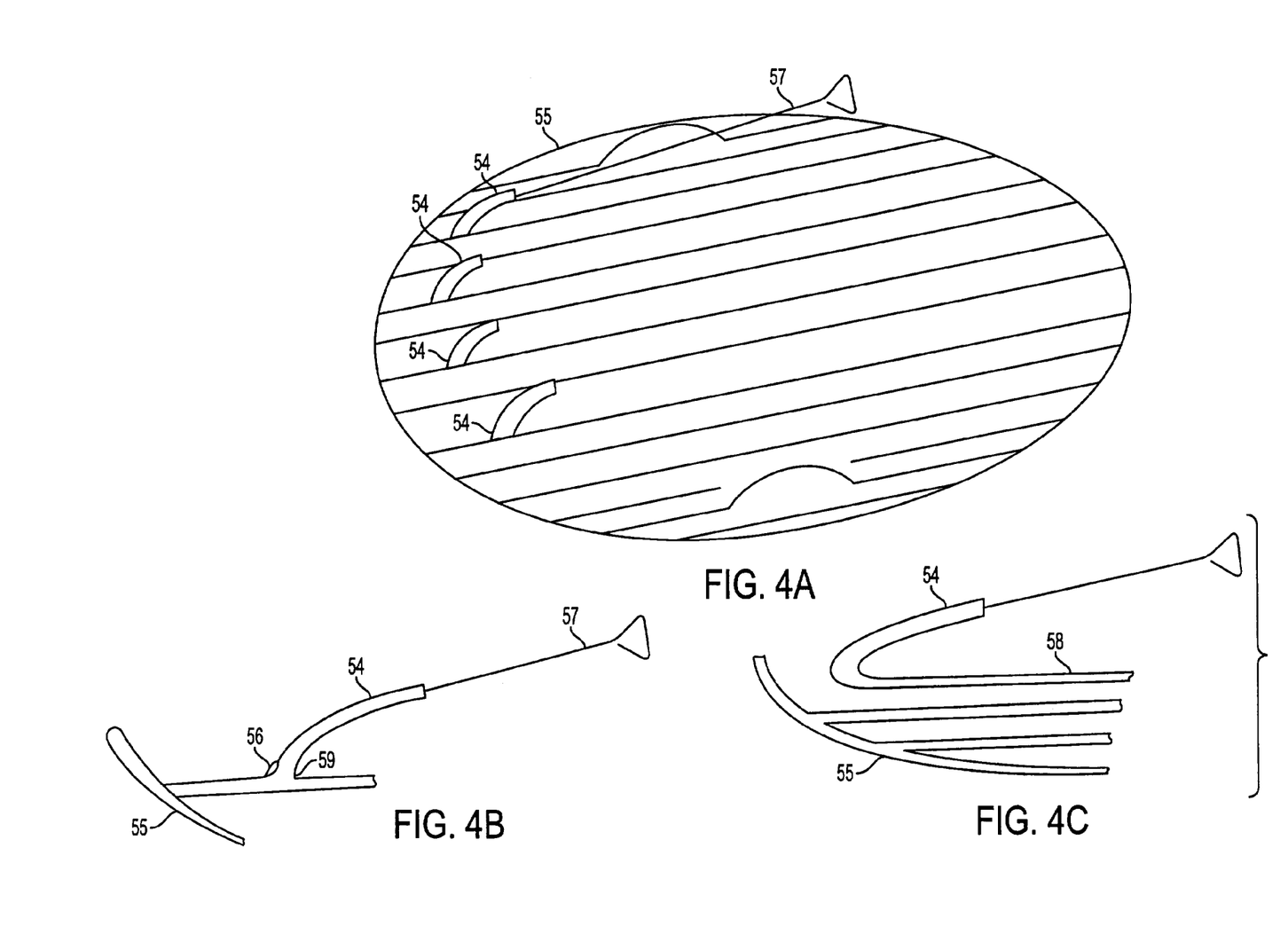
FIG. 4A illustrates an embodiment of the invention whereby the holder is integral with a grate.
FIGS. 4B and 4C illustrate optional variations of the integration of the holder and grate as originally shown in FIG. 4A.

FIG. 4A illustrates an alternate embodiment wherein the tubes 54 that receive the skewers 57 are integral with the grill 55 itself, preferably attached by welding. FIG. 4B provides a closer view of one such holder, and it shows that a weep hole 56 is preferably provided to allow juices to drip out of the tube, and it also shows the preferred welding point 59. FIG. 4C illustrates an alternate embodiment wherein the tube 54 is formed from the end of the grate bar 58. The tubes shown are curved in a preferred embodiment, but straight and angular tubes are also included within the scope of the invention.

An alternate embodiment includes a tube, sleeve, or u-shaped holder that includes a two flared top members. The flared top members are positioned around two grate rods so that the holder extends below the surface of the grate. Preferably, a drip hole is provided at or near the bottom of the holder. The holder preferably extends about 1 ½ inches to 2 inches below the grate rods.

In an alternate embodiment, a universal add on attachable skewer holder takes advantage of existing pre-manufactured expanded steel. Typically, such steel includes ½" or ¾" holes. However, any hole diameter that is large enough to receive a skewer is acceptable. The existing holes serve as the rests for the skewers to be held in place. The skewers may be placed in these holes at angles dictated by the holes, provided that the skewers pass through both elements of the holder. The steel may be formed into a U-shape, and a top plate is fastened, for example welded, to opposing edges of the steel (i.e., the arms of the U). A bottom plate is fastened to the top plate as the grate is positioned between them. Bolts, nuts and other fasteners may be used.

Figure 5:
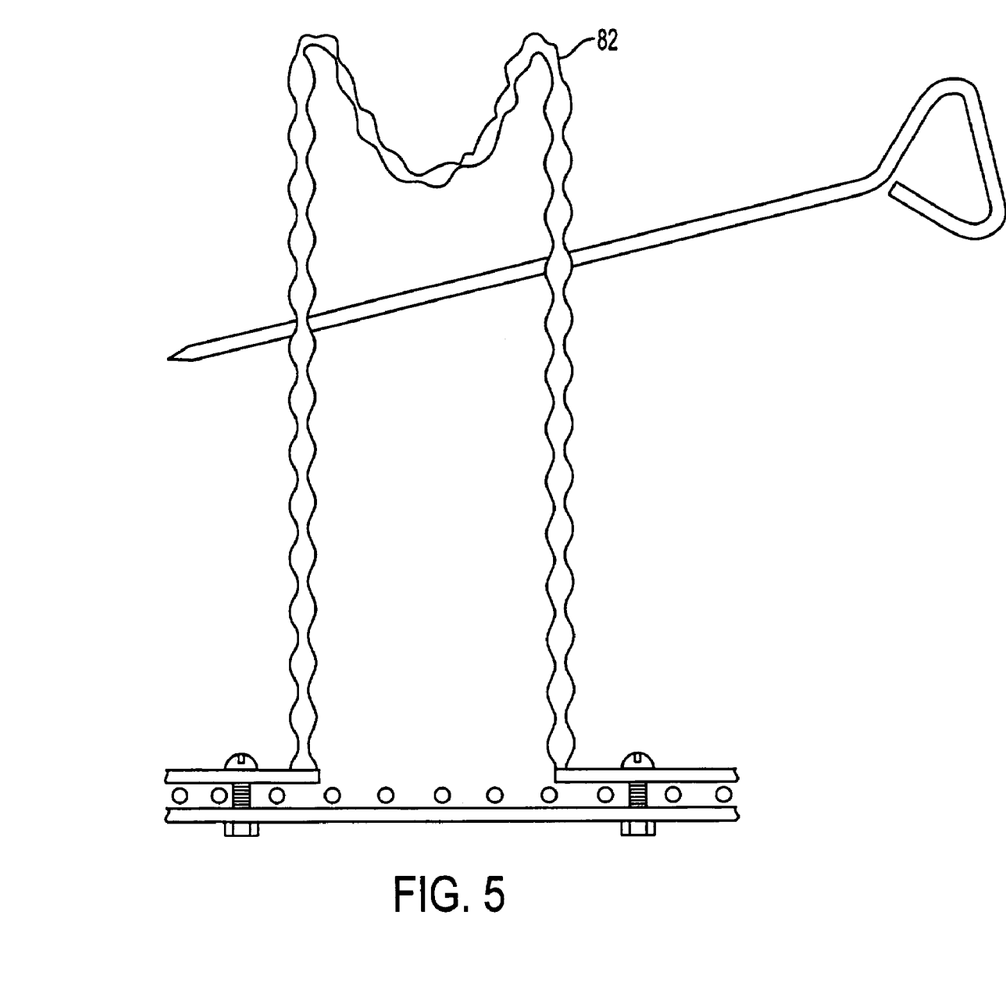
FIG 5 illustrates alternate embodiments wherein the skewer holder is formed using expanded steel.

FIG. 5 illustrates a variation, wherein the steel 82 is shaped in a trapeze shape, and the trapeze allows for the suspension of additional items (empty skewers, buns, etc.) over the cooking surface.

Figure 6:
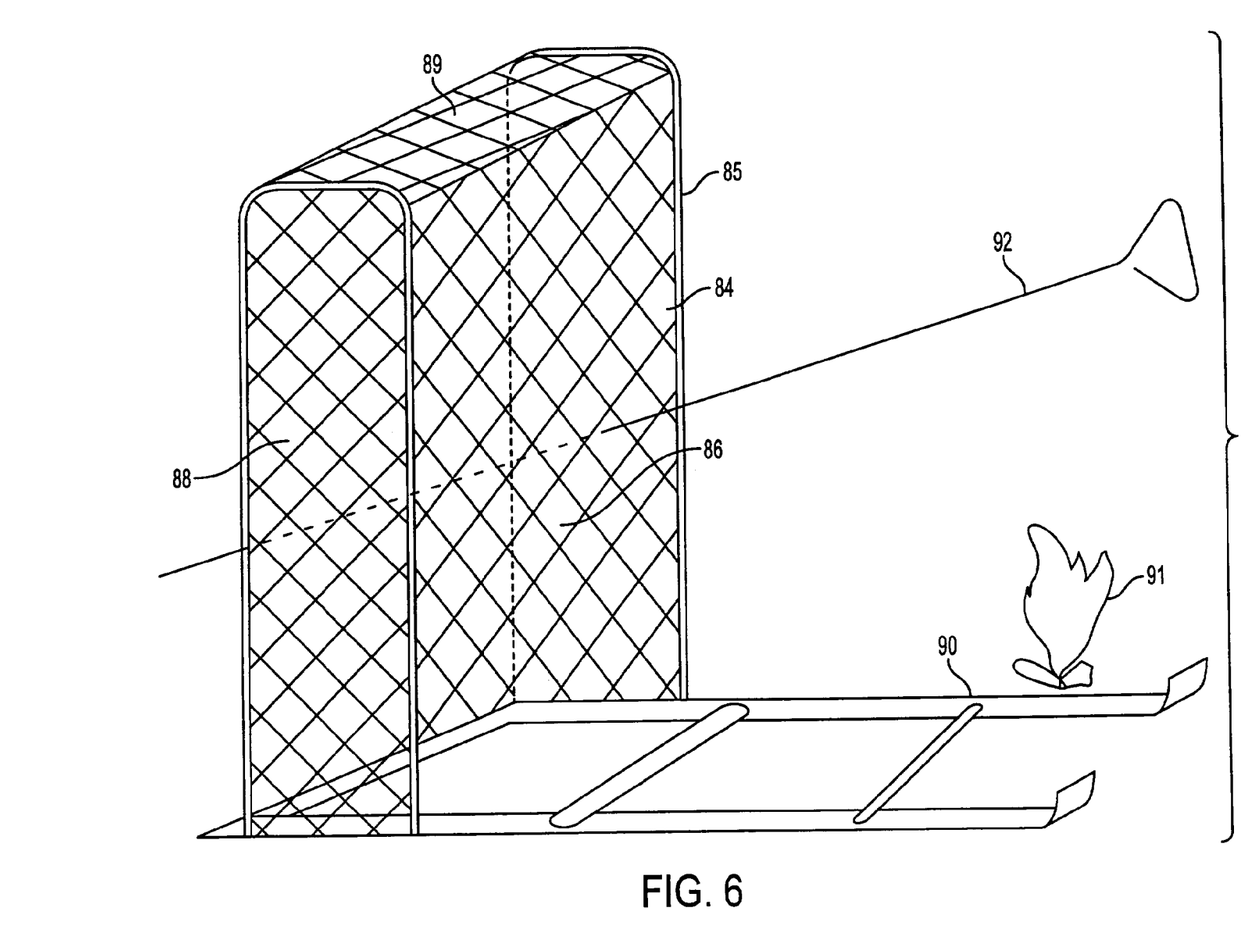
FIG. 6 illustrates a larger embodiment using expanded steel and suitable for fireplaces.

FIG. 6 illustrates a modified version of the embodiment of FIG. 5. The embodiment of FIG. 6 is intended for use with open flames, such as in fireplaces or fire pits. This holder 84 is made of a metal such as expanded steel and is supported by a rigid skeleton or frame 85. The expanded steel is preferably ½" or ¼" expanded steel, although any size may be used. The steel is wrapped around and/or attached, such as by welding, to the skeleton 85 to form a front 86 and a back 88. Optionally, a single piece may be used to wrap around the top, or two pieces may be used to form the front and back. The sides are preferably open to allow easy cleaning and ventilation. The skeleton is attached to a skid-type base 90. The forward and/or skid may slide under the flame, such as logs or gas burner. When used in a fireplace, the expanded steel frame is preferably positioned in the rear of the fireplace, and the skewers 92 are held in place by the skewer holder, suspending the food over an open fire or wood coals or charcoal. The overall size is preferably large enough to accommodate longer fire place skewers. For example, the front and back are preferably 17" to 34" wide and up to 24" high. The base is preferably 24" to 36" long, although other sizes may be used.

Figure 7:
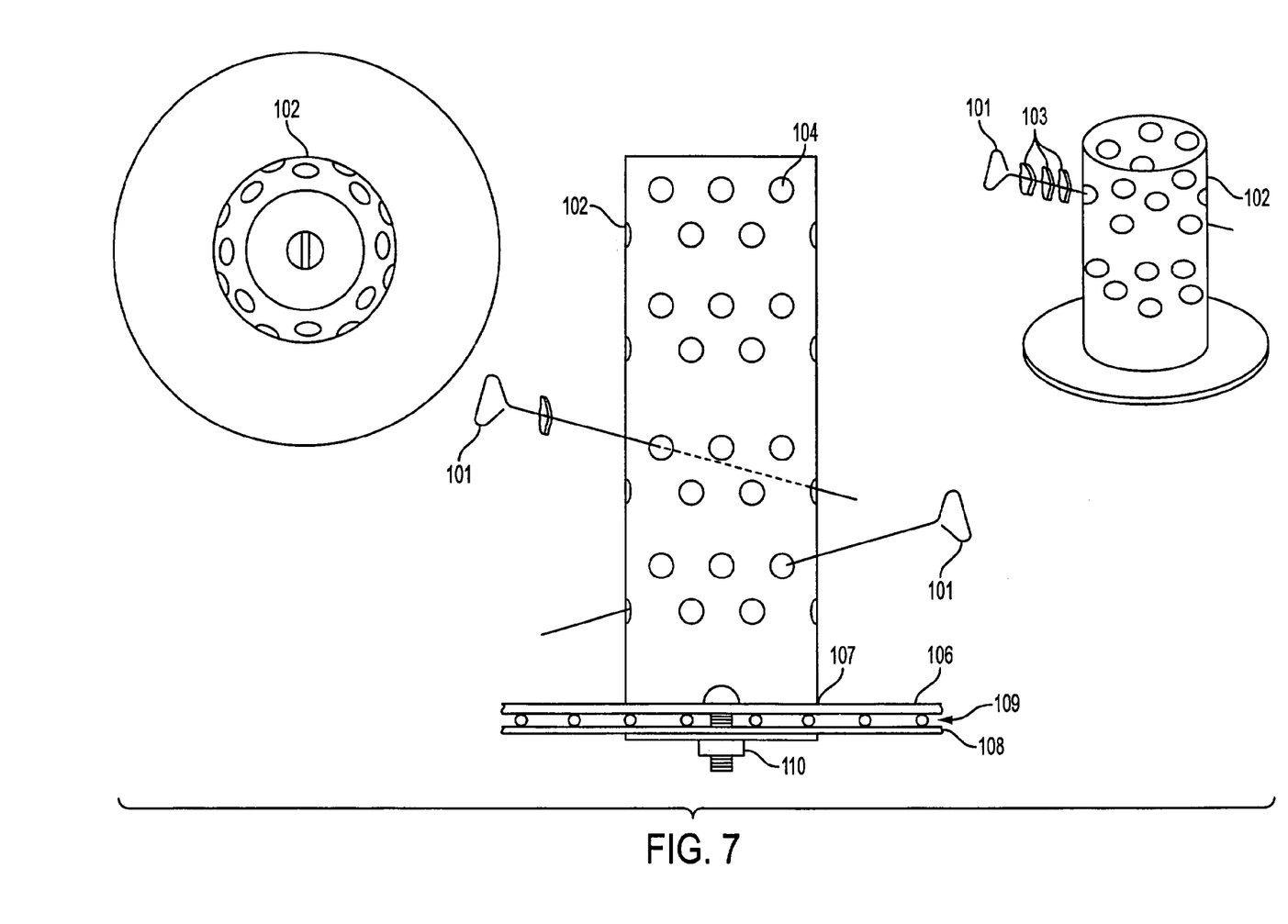
FIG. 7 is an alternate embodiment using a cylindrical holder having a plurality of openings.

FIG. 7 provides three views (top, side and perspective) of an alternate embodiment comprising a cylindrical shaped tower or holder 102 with holes 104 or any shaped perforations that the skewers pass through. As illustrated in FIG. 7, the skewers pass in one side of the tower 102 and out the other side so that the skewers are angled upward slightly at the handle end and the skewered food 103 is secured around the tower.

Because skewers can be placed in any of the holes, this skewer holder permits the skewers to be raised or lowered closer or further away from the heat source to control the cooking temperature. Also, skewers can be placed in a radius around the tower, and multiple skewers can be held in the tower at the same time.

Preferably, the holes 104 have a diameter that is at least $^{17}/_{64}$" to permit insertion of the skewers at angles while prohibiting too much "play" or unwanted movement of the skewers. The alternating hole pattern illustrated in FIG. 7 is preferred so that skewers may be placed into the upper row of any pattern such that the exit the tower through the lower row of the same pattern. Preferably, the tower 102 is at least about 2 ½ feet high, although any tower height may be used. For example, the perspective view in FIG. 7 illustrates a shorter tower having only two skewer rows while the side view shows a tower that is approximately 4 ½ feet high and which has four skewer rows. The tower is attached to a base 106, such as a metal plate. The plate may be welded at a welding location 107 or otherwise attached to the tower. Preferably, a lower base 108 is also included such that the upper base 106 is placed onto the grill top 109 while the lower base is placed under the grill top 109. A fastener 110, such as a bolt with nut and washer, connects the upper base 106 to the lower base 110 and secures the entire structure onto the grill 109. Thus, unlike existing skewer holders which are formed to be integral with the grill, this skewer holder may be used with existing grills, and it may be transferred from one grill to another. The skewer holder may be attached to a grill at any position or location, but a location at or near the center of the grill is preferred as it permits the maximum use of this tower type of skewer.

Figure 8A:
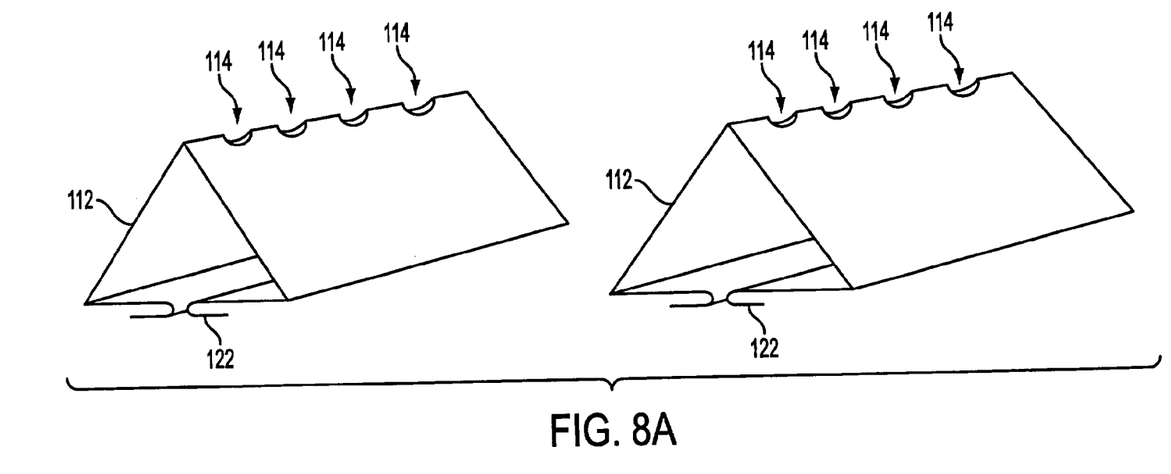
FIGS. 8A and 8B illustrate a free-standing alternate embodiment.
Figure 8B:
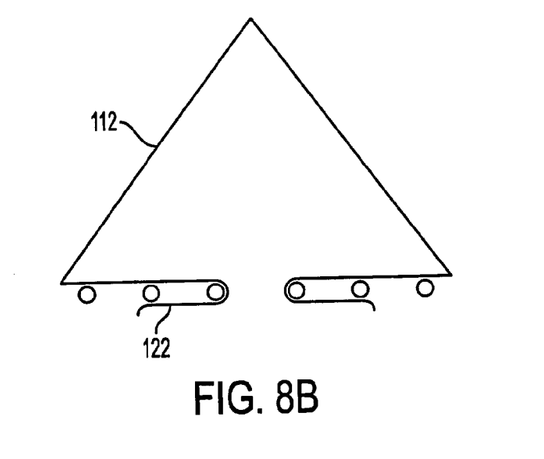

In an alternate embodiment, two or more support elements 112, preferably comprised of a metal, are shaped into an upside-down and flared "V" shape. At the apex of each element, a plurality of skewer slots 114 are provided on which a skewer may rest. The support elements may be attached to a grill by including two flared elements 116 that rest upon the grill, and a base plate 118 that rests under the grill, with fasteners 120 such as nuts and bolts. Alternatively, the support elements may by free standing, or they may include curved or angled undersides 122 that secure each element to a grate as illustrated in FIG. 8A. FIG. 8B shows a side view of one of the support elements 112 of FIG. 8A. In each embodiment, the slots 114 preferably have a width of between ¼" and ½", and they are preferably spaced at least about two inches apart, although other dimensions are included in the scope of the invention. The distance between the support elements may be adapted to any spacing that is appropriate for the specific skewers that are used. Preferably, each of the support elements and the base plate are formed of a single piece of metal to provide easy and cost-efficient manufacture.

Figure 9A:
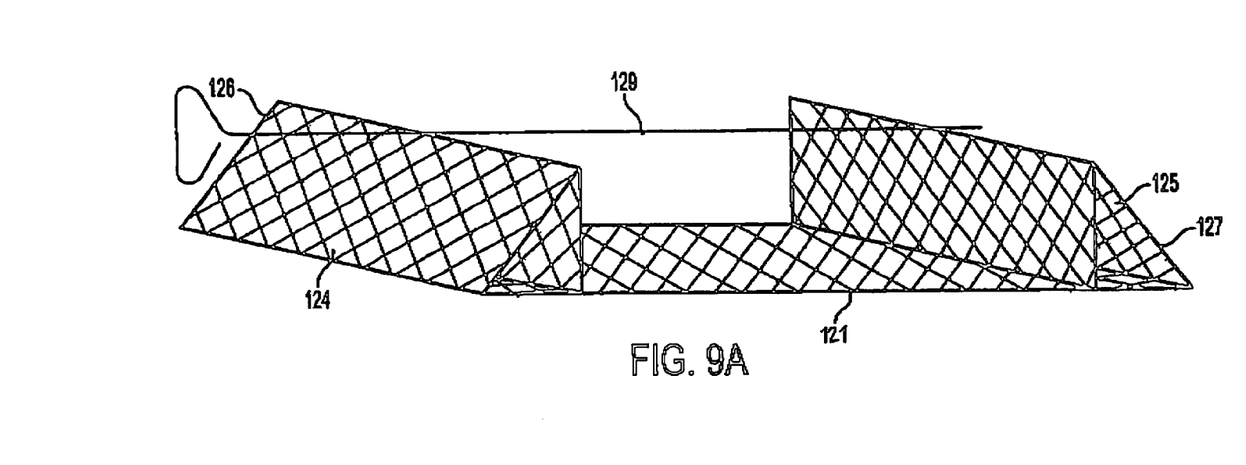
Figure 9B:
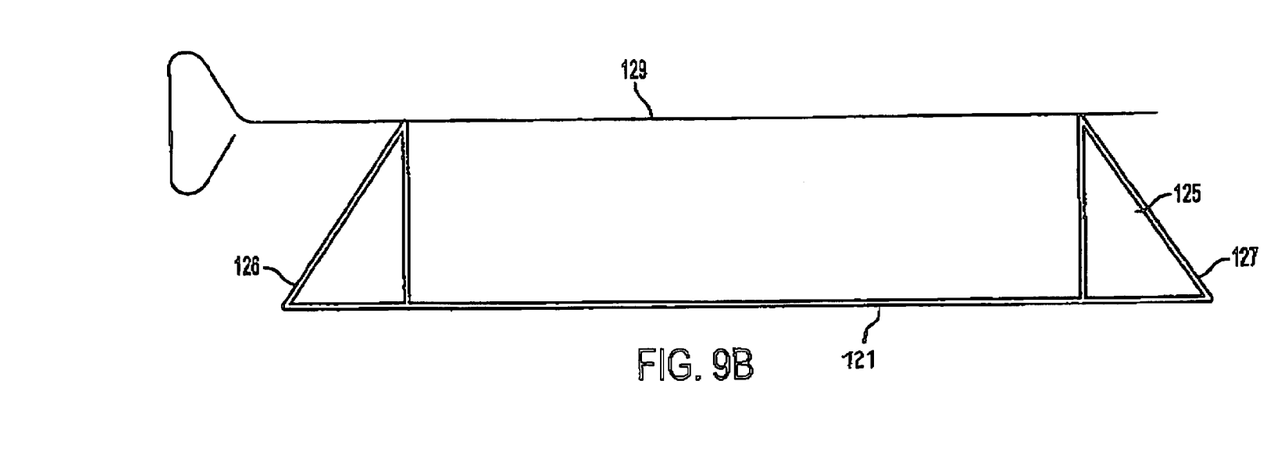
FIG. 9B illustrates a side view of the embodiment of FIG. 9A.

FIGS. 9A and 9B illustrates a one-piece variation, constructed of expanded or mesh steel, parallel to the grate. It can be used on gas, charcoal or electric grills, or in ovens or other locations. Viewing FIG. 9A, a singe piece of expanded or mesh steel 125 is bent to form at least two substantially triangular support elements 126 and 127. The bending may be done by hand or with the assistance of a machine. A base plate 121 may be located between and/or be part of the support elements 126 and 127. A skewer 129 may then be supported by the support elements 126 and 127. The distance between support elements can vary depending on the length of the skewer. The width of each support element is preferably about nine inches to accommodate multiple skewers while still fitting on a conventional grill, although other sizes are acceptable. Drips pass directly through the holes 124 of the mesh.

Figure 10A:
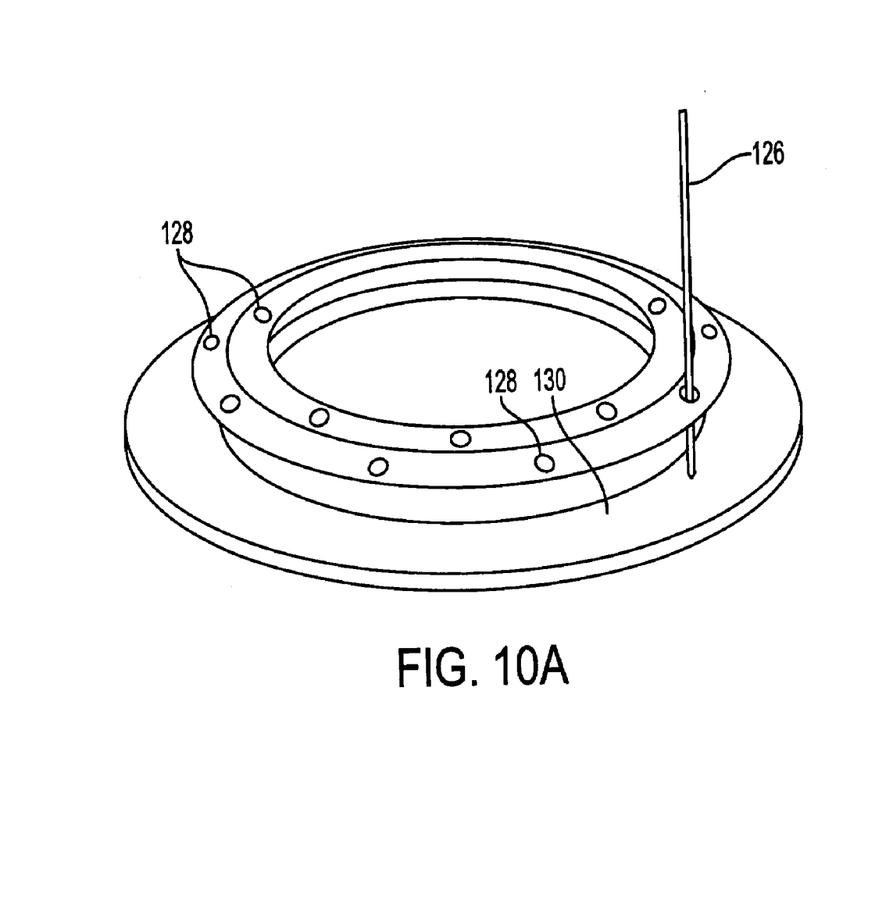
FIGS. 10A through 10D illustrate an embodiment suitable for use in microwave ovens.
Figure 10B:
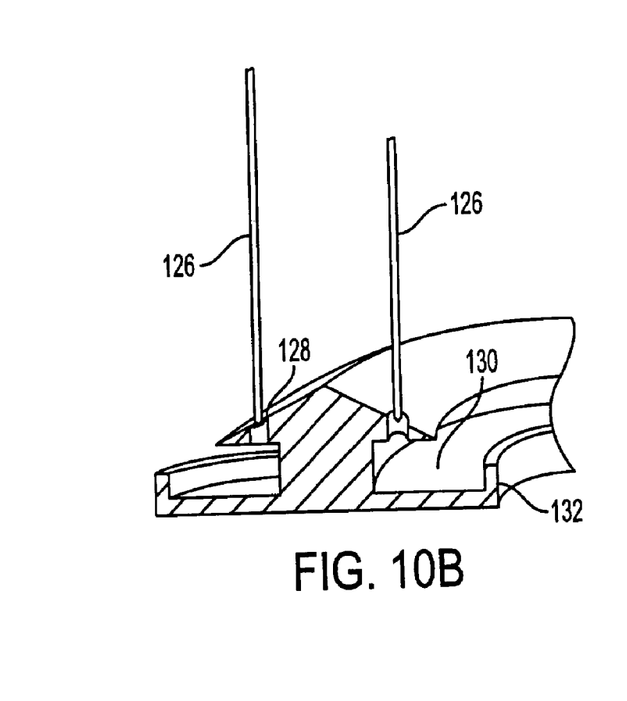
Figures 10C, 10D:
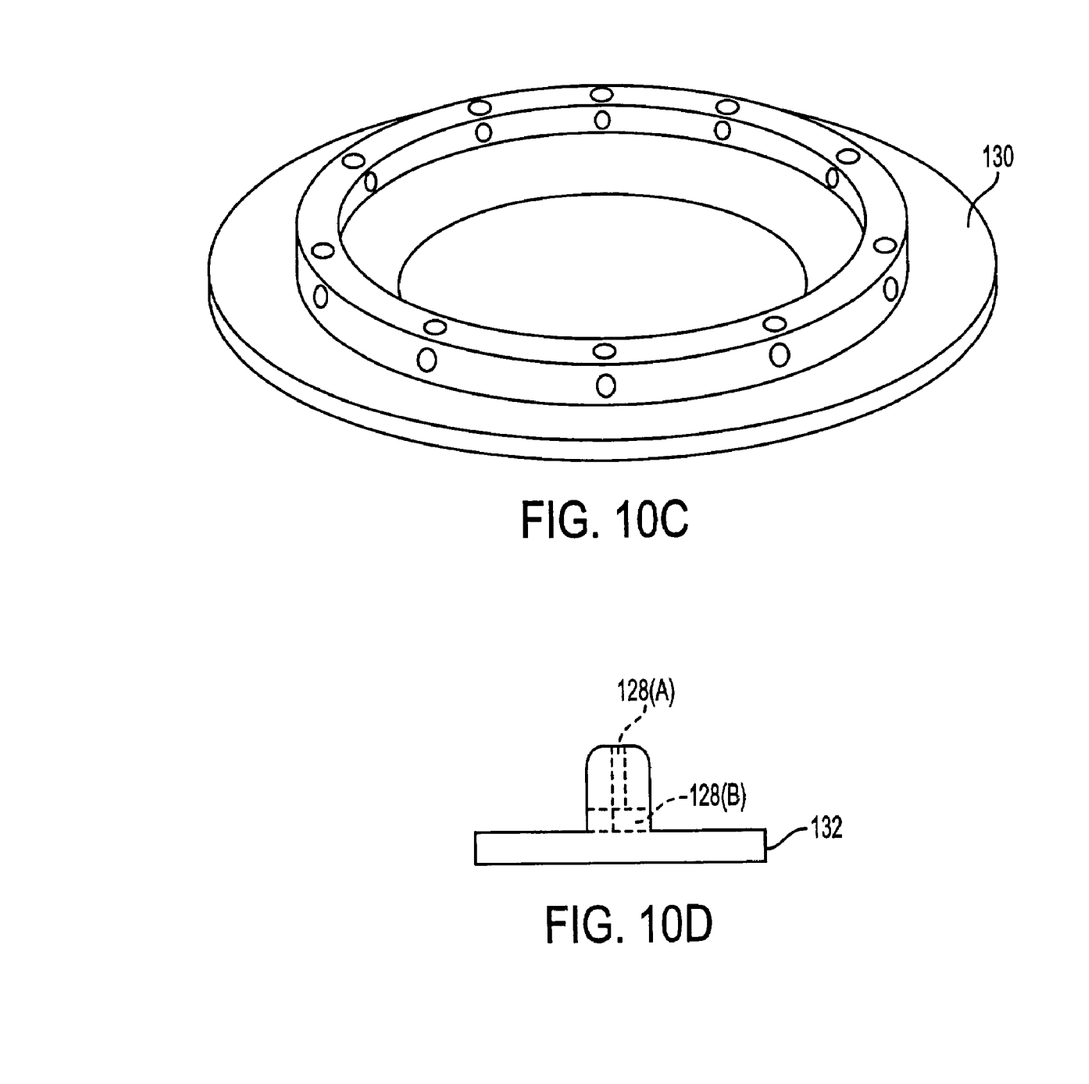
Figure 11:
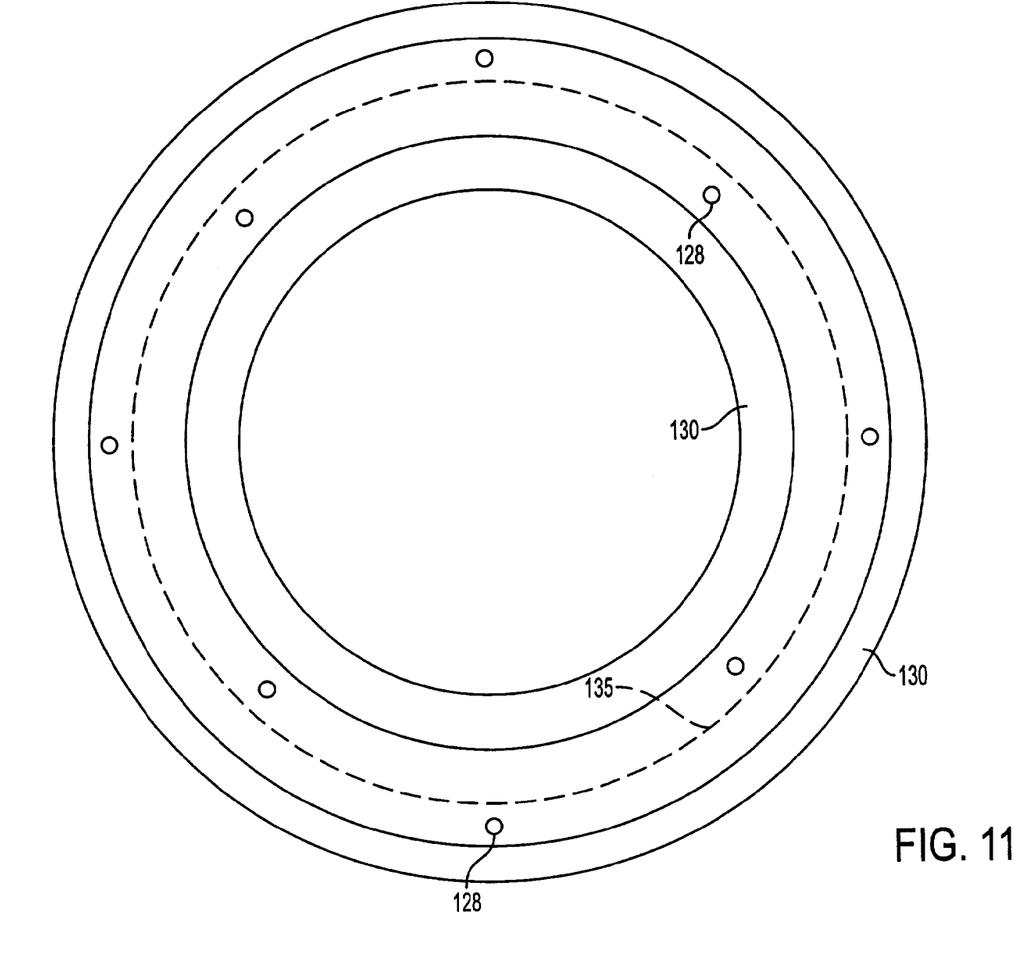
FIG. 11 illustrates a top view of the embodiment of FIGS. 10A and 10B.

FIGS. 10A–10D and 11 illustrate an embodiment of a skewer holder that is suitable for use in microwaves. Constructed of any microwavable material, its design allows for the use of wooden, bamboo, plastic, or ceramic skewers. Skewered food is held vertically by placing the skewers 126 substantially upright in receptacles 128 that are staggered around the holder. In the embodiment illustrated in FIGS. 10A, 10B, and 11 the top 135 of the holder preferably is domed to allow juices to run off. Each of the receptacles 128 includes an open top for receiving a skewer and a drain opening at the bottom for allowing juices or other fluids to run out of the receptacle. The drain opening may extend vertically through the dome as illustrated in FIG. B, or the skewer receptacle 128A and drain opening 128B may be perpendicular to each other as illustrated in FIG. 10D, thus eliminating the need for a domed top. In the embodiment illustrated in FIGS. 10C and 10D, drain opening 128B preferably has an inner diameter that is larger than that of skewer receptacle 128A to allow for the flow of juices or other fluids. In each embodiment a drip area 130 is preferably provided to catch juices or other fluids from the drain openings. This design permits the holder to be used substantially in all microwaves, including the revolving type. The holes are preferably drilled or punched so that cleaning can be more easy. Also, the portions of the receptacles that hold the skewers in a substantially vertical position preferably do not have slits or other openings along the sidewalls so that, unlike prior art skewer holders, they can accept thin skewers. In the embodiment illustrated in FIGS. 10A and 10B the holes are preferably located in the top portion of the holder, but not in the base 132 so that juices do not run out of the drip area. Similar features are shown in FIGS. 10C and 10D. The base 132 serves as a drip pan to collect the juices from the skewered food. Preferably, the holder allows for at least eight skewers to be positioned vertically. The holder shown is circular in shape and can be easily cleaned in a dishwasher or hand washed and uses standard wooden or bamboo skewers. Alternate shapes, such as square or triangular shapes, may also be used.

Preferably, the embodiments disclosed herein are such that skewers are supported only at the skewer pointed ends. The handle end of each skewer will point upwards and/or at an angle. For grills having covers, the angle is preferably such that the skewer will not interfere with closing of the covers.

The free standing skewer holders may be angled to a higher degree to accommodate longer, heavier skewers and cooking larger quantities of food. The bases of free standing skewer holders may also be lengthened to achieve more stability and strength to hold and support the increase in lengths of the skewer and weight of food being cooked.

Foods that can be cooked on skewers, when placed on the skewer holders include meat, such as cubed lamb or other red meat, pork, steaks, chops, hotdogs and all other sausage-type of meats, seafood such as shrimp and lobster, poultry such as wings, vegetables such as potatoes, peppers, tomatoes, onions, fruits such as apples and mushrooms, and marshmallows and other foods that can be impelled on a skewer.

These skewer holders have applications in and outside the home or apartment, for recreation such as camping, picnicking, and in commercial use such as restaurants.

The skewer holders described herein are preferably stationary with no moving parts in their operation. The skewers rest in or on the skewer holders, to facilitate clean, safe cooking while reducing the mess of food sticking to a cooking grate or being contaminated by a dirty cooking grate.

Preferably, there are no electric motors needed to rotate the food on these skewer holders. The user may manually rotate the skewers while the skewers are held in place by the skewer holder. However, embodiments that provide for machine rotation are intended to be included within the scope of the invention.

The invention is not limited in its application to the details of construction and to the arrangements of the components disclosed herein or illustrated in the drawings. The invention is capable of other embodiments and of being practiced and carried out in various ways. Also, it is to be understood that the phraseology and terminology employed herein is used for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A free-standing apparatus for holding a plurality of skewers over a heat source during the cooking of food, the apparatus comprising:

at least two support members formed into an upside-down and flared "V" shape, wherein each support member has an apex that is adapted to serve as a rest for a plurality of skewers; and a base plate;

wherein each support member is connected to at least one other support member via the base plate; and wherein each support member and the base plate are formed of a single piece of metal.

2. The apparatus of claim 1, wherein the single piece of metal comprises expanded steel.

3. An apparatus for holding a skewer over a heat source comprising:

a plurality of support members formed into a pyramidal shape, wherein the pyramidal shape includes an apex that is adapted to serve as a rest for one or more skewers, wherein each of the support members comprises metal; and a base plate that integrally connects the support members, wherein the base plate and support members are formed together from a single piece of material.

4. The apparatus of claim 3, wherein the base plate comprises a mesh.

\* \* \* \* \*